Patented Aug. 21, 1928.

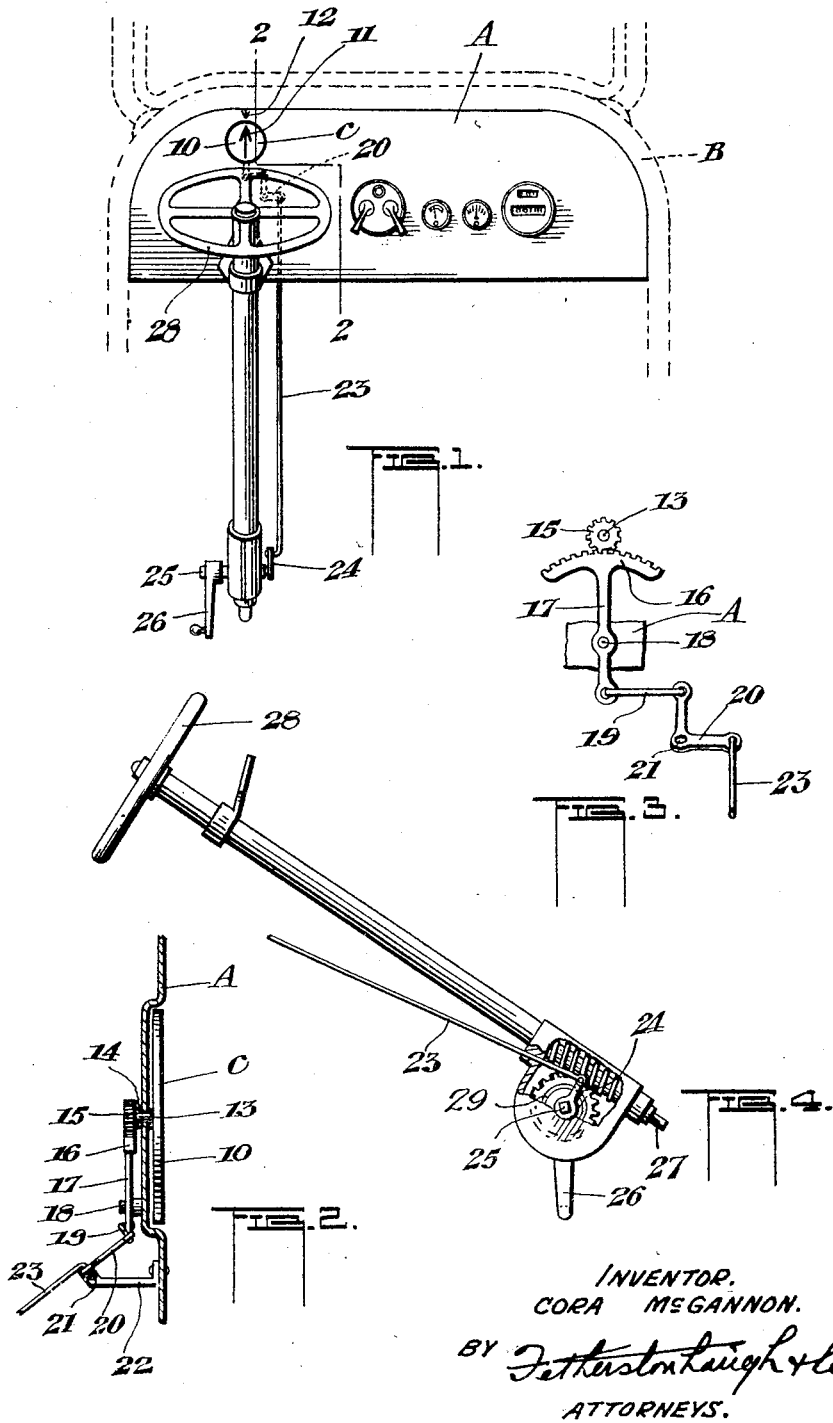

1,681,867

UNITED STATES PATENT OFFICE.

CORA McGANNON, OF BROCKVILLE, ONTARIO, CANADA.

DIRECTION INDICATOR.

Application filed August 22, 1927. Serial No. 214,735.

This invention relates to improvements in direction indicators for vehicles, and more particularly to direction indicators for automobiles automatically operable with the steering means.

One object of the invention is to provide a device of this description associated with the instrument board and automatically operable by the steering wheel, whereby on the steering wheel being operated the direction in which the front wheels are moving is automatically disclosed.

Another object is to provide a simply constructed, durable and inexpensive indicating device that will automatically operate with the front wheels to indicate to the driver, at all times the position of the front wheels, whether to the right or to the left or straight on. In other words, direction indicating instrument that moves concurrently and automatically with the means for steering the front wheels.

A still further object is to provide a direction indicator co-ordinating and co-operating with the steering mechanism of an automobile, whereby the position of the front wheels is automatically disclosed to the driver at night as well as in the daytime.

Yet another object is to provide a direction indicator as above mentioned which will accurately disclose the position of the front wheels to a person in the automobile, on the steering mechanism being operated or at rest, irrespective of the size of the tires on the machine, and thus obviate the necessity for leaving the car to ascertain more accurately the position of said wheels.

A still further object is to provide a direction indicator equally visible in the dark or daylight that will be an attractive addition to the furnishings of the instrument-board.

The invention further relates to an indicator suitably and conveniently arranged visible to the driver of an automobile and automatically operable with the steering wheel turns right and left from a straight wheel in each direction, approximately 630° until it reaches a cramped position. This corresponds to an actual 1¾ turn in each direction from straight front wheel position. Consequently when the indicator is placed on the rim of the steering wheel or in the instrument board it would come back to zero again at one revolution, and to obviate this objection improved mechanism has been provided to operate the indicator.

With the foregoing and other objects hereinafter more fully referred the invention consists in the combination with the steering mechanism of an automobile of a direction indicator co-ordinating and operable therewith, adapted to be conveniently placed and to clearly indicate automatically to the driver of the automobile the position of the front wheels in daylight or dark.

Referring now to the drawings in which an example only of my invention is disclosed and in which like numerals of reference indicate corresponding parts in each figure:

Figure 1 is a front elevation of an automobile instrument board with the indicator fitted therein.

Fig. 2 is an enlarged section on the line 2—2 of Fig. 1.

Fig. 3 is a rear elevation of the indicator operating mechanism.

Fig. 4 is a side elevation of the steering column and operating rod.

Referring now more particularly to the drawings in which, as previously mentioned, only an example of my invention is disclosed, A indicates the instrument board of an automobile B in which are placed the usual instruments, including the direction indicator C in the form of a dial 10 on the face of which is indicia or an arrow 11, adapted in normal zero position to register with a zero mark 12 on the instrument board also in the form of an arrow. This dial 10 is fixedly mounted on a spindle 13 in turn rotatably mounted in a suitable bearing 14 in the instrument board, see Fig. 2.

On the spindle is fixedly mounted a pinion wheel 15 designed to mesh with the rack 16 integral with an arm 17 pivotally mounted at 18 on the underside of the instrument board. This pinion and rack construction obviates the objection of the dial 10 returning to the mark 12 on one revolution of the steering wheel as hereinafter more fully described. In other words the rack 16 is of sufficient length to engage with the pinion 15 progressively, while the front wheels are being operated to the extremity of their turning capacity.

Connected to the protruding end of the arm 17 is a link 19 in turn connected to a bell crank lever 20 pivotally mounted at 21 on a bracket 22 on the instrument board, and connected in any other suitable manner to a rod 23. This rod 23 is connected to an arm 24 fixedly mounted on a spindle 25 on which is rigidly mounted an arm 26 adapted to be connected in any well known manner to the drag rods of the steering mechanism (not shown) for operating the front wheel. A gear 29 on the spindle 25 is also provided and meshes with a worm on the steering column 27 in turn operable by the steering wheel 28.

From the foregoing it will be seen that on the steering wheel 8 being turned to the right or to the left and the spindle 25 rotated, the arm 26 will be operated to turn the front wheels to the right or to the left through the steering mechanism and that simultaneously through the arm 24, rod 23 and lever and link mechanism 20 and 19 the rack 16 will be moved to the right or to the left as the case may be, turning the pinion wheel 15 on the shaft 13 which will in turn rotate the dial 10 to indicate the exact angle from the straight of the wheel while in normal position the arrow or other indicia on the dial 10 will register with the arrow mark 12 on the instrument board.

The simplicity of the invention, composed as it is of few parts, makes it readily attachable to existing constructions without interfering in any way therewith and while here shown as placed on the instrument board opposite the steering wheel it will be understood that the indicator dial can be placed in any suitable manner on the instrument board or elsewhere.

An essential feature of my invention is the fact that the indicator C with the suitable indicia thereon can be made of luminous material indicating in darkness or daylight equally as well the exact position of the front wheels. Furthermore in operation it is automatic with the movement of the front wheels, and that with these practical attributes as well as from an ornamental point of view it will be an addition to the instrument board and will also provide a new feature at present absent from automobile equipment.

It will be understood that the construction disclosed in the present equipment invention may be modified to suit existing requirements without in any way departing from the spirit or scope thereof.

As many changes could be made in the above construction, and many apparently widely different embodiments of my invention within the scope of the claims constructed without departing from the spirit or scope thereof, it is intended that all matter contained in the present specification and accompanying drawings shall be interpreted in an illustrative and not in a limiting sense.

What I claim as my invention is:

1. A front wheel angle indicator for automobiles and the like comprising a dial in the instrument board provided with an indicator, a spindle rotatably mounted in said board and rigidly connected to the dial, a pinion wheel fixedly mounted on said spindle, an arcuate rack member formed with an arm pivotally mounted on the instrument board and designed to progressively engage with said pinion wheel, a pivotally mounted bell crank lever, link connected to the rack member, a rod connected to said lever at one end and operatively connected to the steering column at the other end whereby movement of the front wheels will effect a corresponding movement of the indicator dial to disclose the angle and direction of the front wheels.

2. The invention according to claim 1 characterized by the fact that the positive connection between the main lever and the steering gear comprises a worm on the steering shaft, a spindle provided with a gear meshing with said worm, a casing for the worm gear, and arms rigidly mounted on the spindle at right angles thereto and in opposite directions to one another, one of said arms being connected to the steering gear and the other of said arms being rod connected to the main lever.

3. A front wheel angle indicator comprising in combination, a rotatably mounted spindle having a gear fixedly mounted thereon, a dial provided with a pointer rigidly connected to said spindle, a pivotally mounted rack member progressively meshing with said spindle, a lever member, and means operatively connecting the lever member with the rack member, and coordinating means operatively connecting the lever with the steering gear.

In witness whereof I have hereunto set my hand.

CORA McGANNON.